Sept. 20, 1932.    G. W. MASON    1,878,285
REFRIGERATOR EVAPORATOR AND TEMPERATURE CONTROL THEREFOR
Filed April 11, 1929

GEORGE W. MASON
INVENTOR

BY
Fred A. Lind
ATTORNEY

Patented Sept. 20, 1932

1,878,285

UNITED STATES PATENT OFFICE

GEORGE W. MASON, OF DETROIT, MICHIGAN, ASSIGNOR TO KELVINATOR CORPORATION, OF DETROIT, MICHIGAN, A CORPORATION OF MICHIGAN

REFRIGERATOR EVAPORATOR AND TEMPERATURE CONTROL THEREFOR

Application filed April 11, 1929. Serial No. 354,350.

This invention relates to artificial refrigeration apparatus and has particular relation to an apparatus of the above designated character which shall be especially applicable for employment as a combination freezing and cooling unit for domestic refrigerators.

An object of the invention is to provide a refrigerant evaporating unit having a portion especially applicable for freezing substances in trays and another portion especially applicable for cooling a refrigerator cabinet.

Another object of the invention is to provide a refrigerant evaporating unit having a freezing tray sleeve, disposed externally of a brine tank, in which the freezing of water and food substances, desired to be frozen, can be accomplished without materially affecting the normal operation of the refrigerator cooling portion of the evaporating unit.

Another object of the invention is to provide an automatic refrigerant evaporating unit which shall be operable continuously in response to the disposition of a warm freezing tray in thermal contact therewith.

A known refrigerant evaporating unit employed widely prior to the invention consisted of a brine tank adapted to receive a plurality of freezing trays in which food substances required to be frozen were contained. In such apparatus substantially the same amount of refrigeration was applicable to any one of the freezing trays and, consequently, a relatively large amount of time was consumed in freezing all of them. Furthermore, the rate of heat exchange between the freezing trays and an evaporating conduit disposed in the brine tank was so much less than the capacity of the refrigerant condensing unit for withdrawing evaporating fluid from the aforesaid conduit, that the apparatus was incapable of continuous operation notwithstanding the relatively large amount of heat contained in the substances in the freezing trays.

This invention is characterized by an apparatus capable of automatic and continuous operation whenever the freezing tray containing a warm substance is inserted therein. By providing a compartment not associated in thermally conductive relation to the remaining portion of a refrigerant evaporating unit, it is possible to evaporate a relatively large amount of refrigerant fluid by the heat received from a warm freezing tray in thermal contact therewith. This result is made possible by the fact that the heat of fusion of the substance contained in the tray is transferred directly to the evaporating conduit, and, consequently, is not dissipated throughout a large quantity of brine where it can not be absorbed quickly by an evaporating conduit.

For a better understanding of the invention, reference may now be had to the accompanying drawing forming a part of this specification in which.

Figure 1:
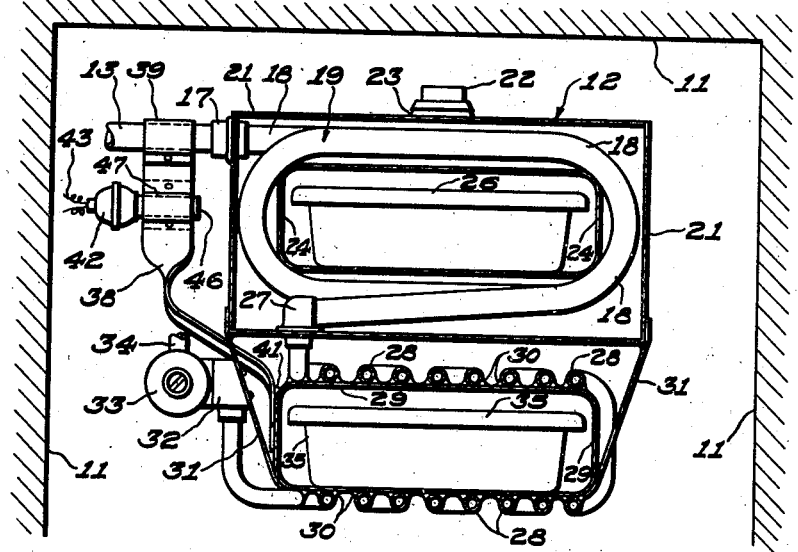
Figure 1 is a fragmentary cross-sectional view of a refrigerator cabinet comprising an evaporating unit embodying one form which the invention may assume.
Figure 2:
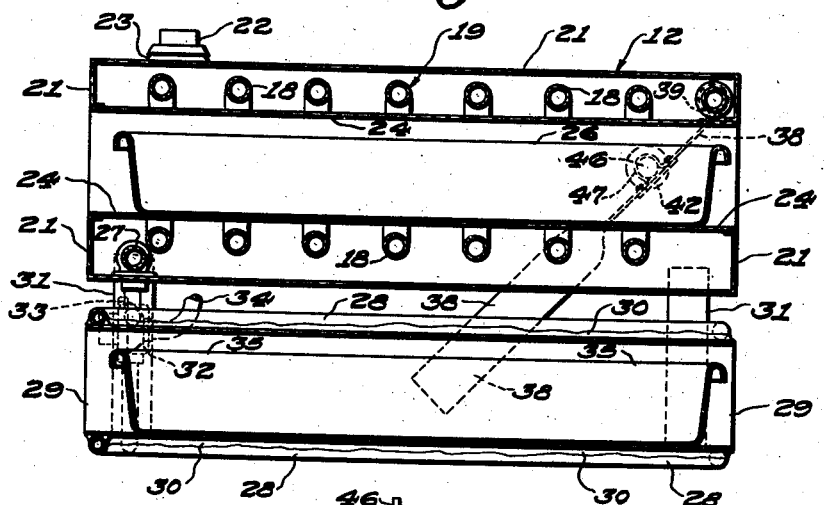
Figure 2 is a longitudinal cross-sectional view through the evaporating unit embodied in the structure illustrated by Figure 1.
Figure 3:
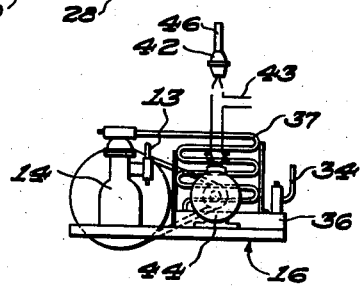
Figure 3 is a refrigerant condensing unit which may be embodied in an apparatus in which the principles of this invention are found.

Referring particularly to Figure 1, the numeral 11 designates a refrigerator cabinet in which a refrigerant evaporating unit 12 is secured in any suitable manner (not shown).

A suction line 13 communicating with a refrigerant fluid compressor 14 of a refrigerant condensing unit 16 communicates through a collar 17 with a section 18 of a refrigerant fluid evaporating conduit 19. The collar 17 is secured rigidly in an opening formed in an upper side portion of a brine tank 21 in which the section 18 of the evaporating conduit 19 is spirally wound.

A filler cap 22 is adapted to close an opening 23 in the brine tank 21 through which a brine solution is introduced into the latter.

A freezing tray receiving sleeve 24 projecting within the brine tank 21, and also within the convolutions of the evaporating conduit section 18, is adapted to receive a freezing tray 26 for the reception of water or food substances of any character desired to be frozen.

An evaporating conduit reduction coupling 27 secured in an opening formed in the bottom of the brine tank 21 is adapted to connect the end of the evaporating conduit section 18 opposite the suction line 13 with one end of a smaller evaporating conduit section 28. This evaporating conduit section is wound in sinuous formation and soldered, as indicated at 30, throughout substantially its entire length, to the upper and lower outer surfaces of a sleeve 29 adapted to receive a freezing tray 35. The freezing tray receiving sleeve 29 is disposed in spaced relation beneath the brine tank 21, and is supported by a plurality of metal straps 31 which are soldered or otherwise secured at opposite ends to the brine tank and sleeve. The end of the conduit section 28 opposite the coupling 27 communicates with a coupling 32 supported by one of the metallic straps 31 through which the aforesaid conduit section communicates with an expansion valve 33. The expansion valve is secured by bolts or other suitable means (not shown) to the coupling 32.

A high pressure line 34, communicating with a liquid receiver 36 of a refrigerant condenser 37, is adapted to supply condensed refrigerant liquid at a relatively high pressure to the refrigerant expansion valve 33.

A metallic bar or heat conductor 38 at one end is connected in good thermal contact, as indicated at 39, with the suction line 13, while the opposite end is soldered, as indicated at 41, to one side of the freezing tray receiving sleeve 29.

A thermostat 42, connected in a power line 43 in series with a motor 44 for operating the refrigerant condensing unit 16, is provided with a fluid containing bulb 46 which is secured by a metallic clip 47 to an intermediate portion of the metallic heat conductor 38.

In the operation of the invention when a freezing tray containing a warm substance is inserted in the sleeve 29, the heat of the substance is conducted very quickly through the heat conductor 38 to the bulb 46 of the thermostat 42. Such increase in temperature of the bulb 46 causes the thermostat 42 to close an electrical circuit through the motor 44 thus effecting the operation of the refrigerant condensing unit within a very short time after the tray is inserted in the sleeve 29. Since the evaporating conduit section 28 is soldered to the sleeve 29 throughout substantially its entire length, the latent heat of fusion of the warm substance is conducted very rapidly to the refrigerant fluid contained in the conduit. Consequently, such fluid is evaporated at a rate substantially greater than the capacity of the refrigerant condensing unit 16 and continues to be evaporated at such rate until the substance is substantially frozen.

When refrigerant liquid eventually is discharged from the conduit section 28 into the conduit section 18, it is evaporated for a considerable period of time before reaching the suction line 13 by the heat absorbed by the brine tank 21 from the interior of the refrigerator 11. Thus it is to be observed that the evaporating unit is continuously maintained in operation for the purpose of freezing the substance contained in the tray 35.

When the brine solution in the tank 21 is reduced to a temperature at which it no longer is capable of evaporating the liquid in the conduit section 18 as fast as it is received from the conduit section 28, some liquid will be discharged into the suction line 13 where its evaporation causes a reduction in temperature of the bulb 46 of the thermostat 42 thus opening the electrical circuit through the motor 44 as a result of which the operation of the condensing unit 16 is discontinued.

At this time, in an apparatus constructed according to the principles of this invention, the substance in the freezing tray 35 will be substantially frozen. However, if such substance is not entirely frozen, the heat conductor 38 will quickly cause an increase in the temperature of the bulb 46 great enough to cause the operation of the thermostat 42, thus initiating another cycle of operations of the apparatus.

From the foregoing description it is apparent that the invention provides a very efficient and economical apparatus for employment in a refrigerator cabinet for the dual purpose of maintaining the temperature therein at a predetermined average value suitable for the preservation of food substances contained therein, and for freezing water or other substances at a very rapid rate.

Although the specification discloses only the preferred form of this invention, and describes in detail but a single application thereof, it will be apparent to those skilled in the art that the invention is not so limited but that various modifications and changes may be made therein without departing from the spirit of the invention or from the scope of the appended claims.

I claim:

1. A refrigerant evaporating unit comprising a brine tank having a refrigerant evaporating conduit disposed therein, said conduit being in direct communication with a suction line of a refrigerant condensing unit, a freezing tray sleeve disposed within the brine tank and surrounded by the aforesaid refrigerant evaporating conduit, a freezing tray sleeve disposed externally of the brine tank and surrounded by a refrigerant evaporating conduit communicating with the first mentioned conduit, a refrigerant expansion device for discharging refrigerant fluid directly into the last mentioned conduit, a metallic heat conductor thermally contacting at its opposite ends, the aforesaid suction line and the last mentioned freezing tray sleeve, and a thermostat secured to an intermediate portion of the heat conductor for controlling the operation of the refrigerant condensing unit.

2. A refrigerant evaporating unit comprising a freezing tray sleeve having a sinuously wound evaporating conduit soldered to the upper and lower surfaces thereof, a suction line communicating with one end of said conduit, a refrigerant liquid expansion device communicating with the opposite end thereof, a metallic heat conductor disposed in thermal contact with the aforesaid sleeve and suction line, and a thermostat associated with the conductor for controlling the operation of a refrigerant condensing unit.

3. A refrigerant evaporating unit comprising a brine tank having a refrigerant evaporating conduit disposed therein, a freezing tray sleeve disposed in spaced relation to the brine tank and directly below the latter, and a refrigerant evaporating conduit, communicating with the first mentioned conduit and soldered to the aforesaid freezing tray receiving sleeve.

4. A refrigerant evaporating unit comprising a brine tank having a refrigerant evaporating conduit associated therewith, a freezing tray sleeve supported by the brine tank in spaced relation below the latter, a refrigerant evaporating conduit associated with the sleeve and communicating with the first mentioned conduit, and means for discharging a refrigerant liquid directly into the last mentioned conduit.

5. A refrigerant evaporating unit comprising a brine tank having a refrigerant evaporating conduit associated therewith, a freezing tray sleeve supported by the brine tank in spaced relation below the latter, a refrigerant evaporating conduit associated with the sleeve and communicating with the first mentioned conduit, means for discharging a refrigerant liquid directly into the last mentioned conduit, and a thermostat disposed in thermal contact to the aforesaid freezing tray sleeve for controlling the operation of the refrigerant condensing unit.

6. The combination with an insulated cabinet arranged for the circulation of air internally thereof, of an elongated metallic freezing tray sleeve directly exposed to the circulating air in said cabinet, a refrigerant fluid evaporating conduit disposed in direct thermal contact with said sleeve, a suction line for exhausting refrigerant fluid from said conduit, a metallic heat conductor exposed throughout its entire extent to the circulating air in said cabinet and connected at opposite ends to the suction line and freezing tray sleeve, and a thermostat disposed in direct thermal contact with an intermediate portion of said conductor for actuating said apparatus in response to the temperature either of the suction line, the freezing tray sleeve, or the circulating air.

7. The combination with an insulated cabinet arranged for the circulation of air internally thereof, of a freezing compartment composed of a substance having a capacity to retain a large quantity of heat internally thereof, a refrigerant evaporating conduit arranged internally of said substance for absorbing heat outwardly from the aforesaid freezing compartment and inwardly from the circulating air in the interior of the refrigerator, a freezing tray sleeve disposed remotely from the aforesaid freezing compartment and intimately associated with the circulating air in the interior of the cabinet, a refrigerant evaporating conduit soldered to the exterior surface of the sleeve, both of the aforementioned evaporating conduits being connected in series for the circulation of refrigerant fluid therebetween, and means for circulating refrigerant fluid throughout said evaporating conduits.

8. A refrigerant evaporating unit comprising a brine tank having a freezing tray sleeve formed interiorly thereof, a freezing tray sleeve disposed exteriorly of the brine tank, an evaporating conduit having one extremity associated in thermal contact with the sleeve within the brine tank and the other with the sleeve disposed exteriorly of the brine tank, and means for admitting refrigerant to the extremity of the conduit associated with the last mentioned sleeve.

In testimony whereof I hereunto affix my signature.

GEORGE W. MASON.